L. WARREN.
Dish-Washer.

No. 216,001. Patented May 27, 1879.

WITNESSES:
Joseph A. Miller Jr
William L. Coop.

INVENTOR:
Lucinda Warren
by Jos. A. Miller
Attorney

UNITED STATES PATENT OFFICE.

LUCINDA WARREN, OF PROVIDENCE, RHODE ISLAND.

IMPROVEMENT IN DISH-WASHERS.

Specification forming part of Letters Patent No. 216,001, dated May 27, 1879; application filed December 30, 1878.

*To all whom it may concern:*

Be it known that I, LUCINDA WARREN, of the city and county of Providence, and State of Rhode Island, have invented new and useful Improvements in Dish-Washers; and I hereby declare that the following is a full, clear, and exact description of the same, reference being had to the accompanying drawings, forming part of this specification.

The object of this invention is to produce a cheap, simple, and effective apparatus in which dishes and table-ware can be expeditiously washed.

The invention consists in the novel arrangement of a dash-wheel placed within a separate compartment, the walls of which are perforated, and located centrally within a box which receives the dishes, as will be more fully set forth hereinafter, and pointed out in the claim.

Figure 1:
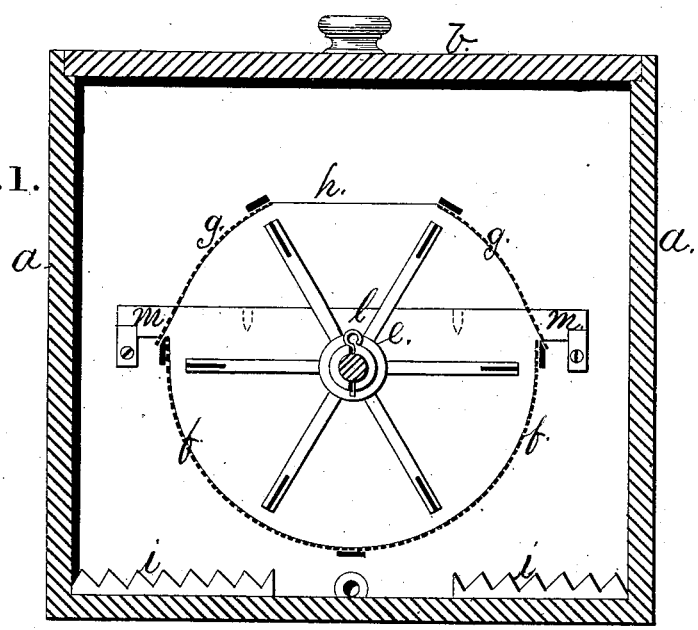
Figure 2:
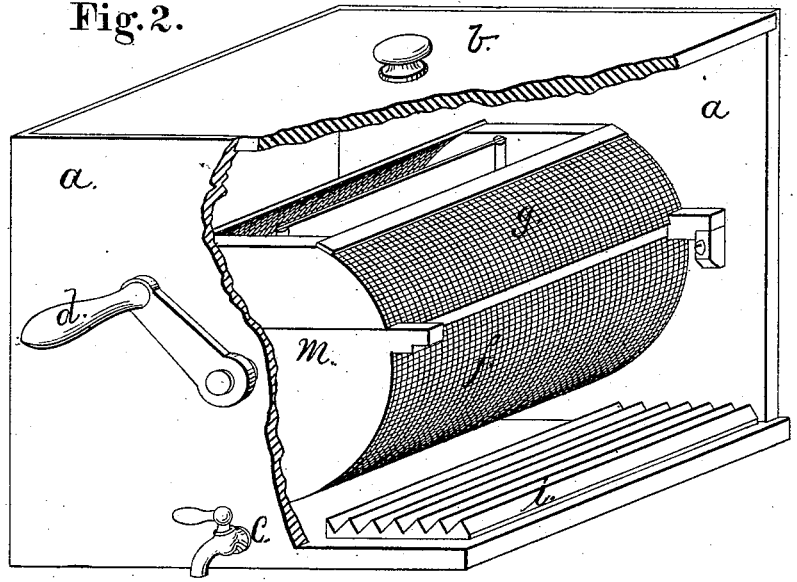

The drawings represent, in Figure 1, a sectional view of my improved dish-washer, showing the dash-wheel, the perforated cylindrical partition surrounding the wheel, and the racks for holding the dishes. Fig. 2 is a perspective view of my improved dish-washer, parts of the box being shown cut away, so as to show the interior more clearly.

In the drawings, $a$ is a case or box of any desired dimensions. $b$ is the removable top of the box, provided with a knob or handle, one or more of them, as may be required. $c$ is a faucet, by which the liquid is drawn from the box $a$. The handle $d$ is secured to a crank on the shaft of the dash-wheel $e$. $ff$ is a cylindrical perforated screen or partition surrounding the dash-wheel $e$ at its lower part. $gg$ is a removable screen, that can be readily raised, and is provided with the opening $h$, on which a tray provided with a perforated bottom may be set, containing small articles of table-ware to be washed. $ii$ are racks, secured to the bottom of the box $a$, on which the dishes to be washed rest, and by which they are retained and prevented from sliding under the cylinder $f$. By withdrawing the pin $l$, the shaft of the dash-wheel can be withdrawn, and as the dash-wheel and the perforated screens $f$ and $g$ are secured to the frame $m\ m$, the whole may be raised from the box and the interior thoroughly cleaned.

The operation is as follows: After the dishes have been placed on the racks $i\ i$, and, if required, the opening $h$ covered with a perforated tray containing small articles, hot water is placed into the dish-washer, with preferably small pieces of soap. The dash-wheel is now rapidly turned, and by its churning and dashing action it forces the water through the perforations against and among the dishes with such force as to wash away any matter, however firmly it may adhere; and when thoroughly washed the water is drawn off by the faucet $c$, and renewed by the introduction of tepid or cold water, or, if preferred, a new supply of warm water. The dash-wheel is again turned, and the water drawn off, when all the dishes and other articles will be found perfectly washed.

For hotels and boarding-houses the dash-wheel can be constantly turned by steam or water power, and, if required, there may be a constant change of the water, or all the water may be drawn off from time to time.

I am aware that a dash-wheel has heretofore been used in dish-washers, and I do not claim the same, broadly.

Having thus described my invention, what I claim as new, and desire to secure by Letters Patent, is—

The dish-washer herein described, consisting of the box $a$, provided with the racks $i\ i$, the removable perforated cylinder $f\ g$, secured to the end pieces, $m\ m$, the dash-wheel $e$, and discharge-faucet $c$, arranged and operating substantially as and for the purpose set forth.

In testimony that I claim the foregoing as my own invention I affix my signature in presence of two witnesses.

LUCINDA WARREN.

Witnesses:
JOSEPH A. MILLER,
JOSEPH A. MILLER, Jr.